United States Patent [19]
Motamed et al.

[11] Patent Number: 5,627,652
[45] Date of Patent: May 6, 1997

[54] MULTIBIT RAM FOR PARALLEL LOOKUP OF HIGH RESOLUTION HALFTONE SCREENS

[75] Inventors: Margaret Motamed, Redondo Beach; William P. Gunther, Simi Valley, both of Calif.

[73] Assignee: Xerox Corporation, Stamford, Conn.

[21] Appl. No.: 544,508

[22] Filed: Oct. 18, 1995

[51] Int. Cl.$^6$ .................. H04N 1/40; H04N 1/46
[52] U.S. Cl. .................. 358/298; 358/456; 358/462; 358/518; 358/534
[58] Field of Search .................. 358/296, 298, 358/456, 458, 462, 464–466, 518, 530, 534, 536, 540; 395/109, 112, 128; 382/254, 276, 299

[56] References Cited

U.S. PATENT DOCUMENTS

| | | | |
|---|---|---|---|
| 4,803,643 | 2/1989 | Hickey | 395/147 |
| 4,949,188 | 8/1990 | Sato | 358/462 X |
| 4,958,219 | 9/1990 | Kadowaki | 358/500 |
| 4,963,898 | 10/1990 | Kadowaki et al. | 346/157 |
| 5,113,492 | 5/1992 | Ariki et al. | 395/147 |
| 5,225,911 | 7/1993 | Buckley et al. | 358/296 |
| 5,563,985 | 10/1996 | Klassen et al. | 395/109 |

*Primary Examiner*—Eric Frahm
*Attorney, Agent, or Firm*—Robert Cunha

[57] ABSTRACT

In a printer for printing text of one color over a background of another color, a method and circuit for allowing the text character outline boundaries to pass through the color halftone dots, creating partial dots in the process, the partial dots within the character boundaries being of the color of the text, and the partial dots outside of the character boundaries being the color of the background. To use a numerical example, to produce an eight bit output dot through which a boundary passes, fifteen halftone bits in the first color are produced for each dot clock, and the rightmost seven bits are latched for the next cycle. On the next clock, fifteen bits are produced, and the leftmost 7 are aligned with the latched seven. If the bits are to the left of the boundary, bits from the first cycle are output, and if the bits are to the right of the boundary, bits from the second cycle are used.

2 Claims, 3 Drawing Sheets

MULTIBIT RAM FOR PARALLEL LOOKUP OF HIGH RESOLUTION HALFTONE SCREENS

BACKGROUND OF THE INVENTION

This is an improved printer circuit and method for creating relatively high output resolution for text while maintaining a relatively low clock speed for the color circuits, and more specifically, is a circuit for first generating a plurality of overlapping output color bits in parallel, and second, using font mask data to decide which color bits are to be used within the mask, and outside the mask, to generate the final output.

There are commercial printers in use which can print halftoned images, computer graphics, text and other forms of visual data on a single page. Some forms of data, such as a halftoned color, have a low frequency dot clock and low resolution, but many bits per dot. Others, such as character outlines, have only one bit per pixel, but require high resolution at the edges, and a higher clock rate. The text color and background colors are typically multiplexed using the font outline as a controlling mask, and in order to preserve all of the attributes of both of the inputs, the output data must be produced at the higher bit rate. U.S. Pat. No. 5,225,911 describes such a system, and is incorporated by reference herein. More specifically, if the edge of a character of one color falls somewhere inside the boundary of a background dot of another color, the circuit must produce two partial dots to preserve the quality of the outline, one of the text character color for the portion of the dot that is inside the character, and the other of the background color for the portion of the dot that is outside the character. An improved method for performing this function while allowing the color generating circuit to proceed at the lower clock speed is needed.

SUMMARY OF THE INVENTION

This invention can be explained by assuming an example of a printing system where a printer will print an output page having blue text printed over a yellow background. If the output at the moment is scanned-in background data, it is first sent to a halftone generator which samples the data at the rate of the system clock, and a number of halftone bits are generated for each clock. For a numerical example, assume that the system clock is running at a rate corresponding to 400 dots per inch and that the printer can accept 3200 dots per inch resolution along the scan line. Then the halftone generator will sample data at the 400 dots per inch rate, and will produce eight output bits for each input. These eight output bits would all correspond to one contone input. Similarly, the text color is generated by producing a blue dot, eight bits per dot, 400 dots per inch. The problem is that the resolution of the edges of the text characters is typically much higher. Assume that the mask data of the characters is 3200 bits per inch. Now it is clear that simply switching the color of the existing dots from blue to yellow will not provide the required resolution. A circuit must be designed which will switch from one color to the other anywhere within the 400 dots per inch resolution boundaries. The method and resulting circuit described herein is simple and low in cost, allows the color generation to operate at the lower speed and preserves the higher resolution text edges.

DETAILED DESCRIPTION OF THE INVENTION

Figure 1:
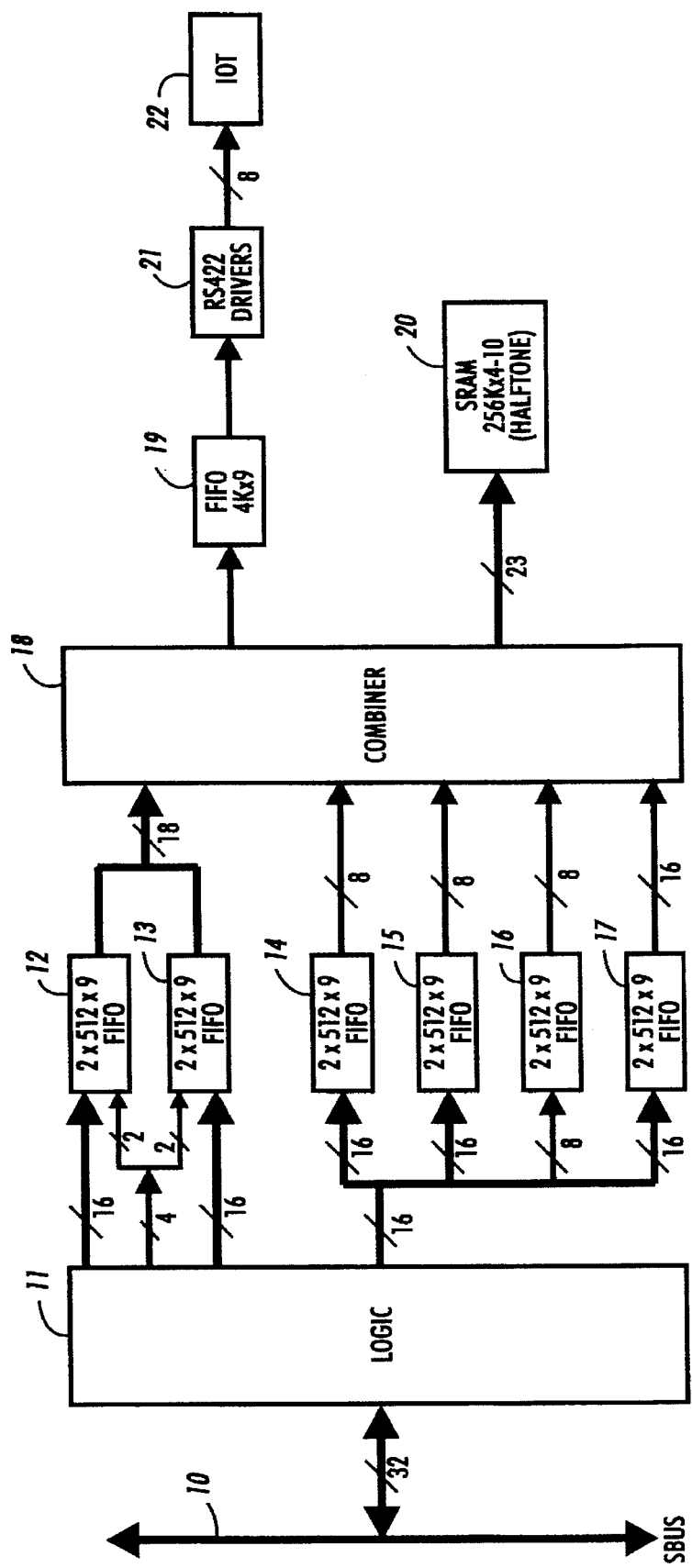
FIG. 1 is a block diagram of the system.

FIG. 1 is a block diagram of the system. All input data is delivered on a 32 bit system bus 10 to the logic block 11. The data that can be loaded into the logic 11 is 8-bit per pixel scanned-in data, 2-bit per pixel mask including text character) data, 8-bit per pixel solid color data, and screen select and instruction data of variable length. The logic 11 assembles the scanned-in data into packages of 16 bits and loads them into FIFO (first in, first out) ping pong buffers 12, 13. An additional four bit instruction word is also sent to the FIFO's to control the loading and unloading of the data. This data is combined in the FIFO's and is output on 18 lines, two 8-bit data words and two instruction bits, as data inputs to the combiner 18. Similarly, constant color data is transferred through FIFO 15 to the combiner 18 data input. Finally, the screen select, mask (2 bit per pixel) and instructions are buffered through FIFO's 16, 14 and 17, respectively, to be used as control lines in the combiner 18.

In accordance with the instructions, the combiner will output as the current 8-bit word either 8-bits of color or image. The output must first be sent to the SRAM (static RAM) 20 for halftoning. There are 23 lines shown as connecting the SRAM 20 and the combiner 18. Twenty of these are address lines. They are eight bits to count the location of the current bit within the halftone screen, eight bits (one pixel) of contone data, two screen select lines to select one of four possible screens, and two control bits. The remaining three lines are SRAM output lines.

Then, either the current halftoned image word, or the current halftoned color word will be sent through a FIFO buffer 19 and through a standard commercial RS422 driver 21 to the image output terminal, which in this case is assumed to be a raster output scanner printer.

Figure 2:
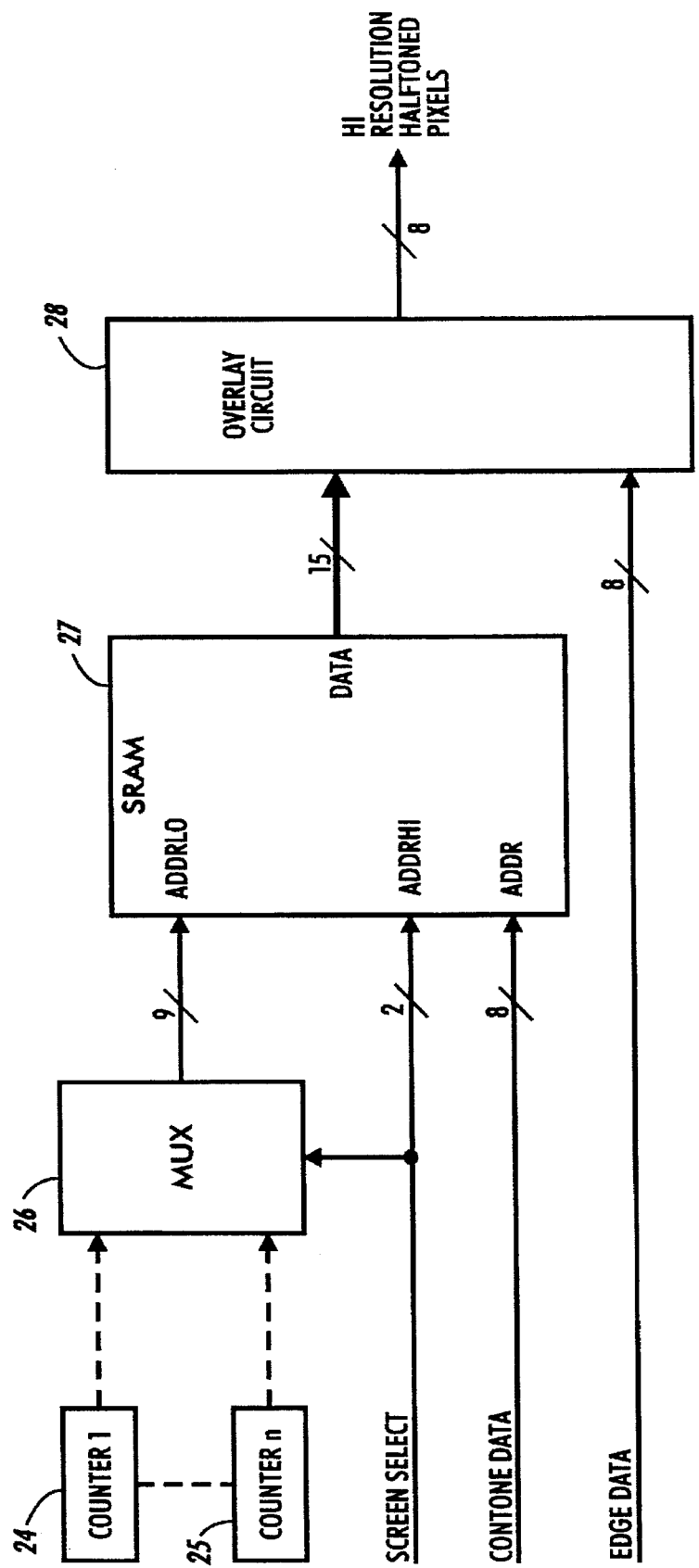
FIG. 2 is a more detailed diagram of the combiner and SRAM circuit.

FIG. 2 is a more detailed drawing of the combiner 18 and SRAM 20 of FIG. 1. In this example, the clock speed of the halftone generator is one eighth that of the bit clock, and therefore, eight output bits will be produced for each halftone cycle.

To produce halftone dots, the generator must know the halftone screen vertical and horizontal line numbers, and for this purpose several counters are used. A number of counters are necessary to the extent that there may be a number of halftone screen sizes; for example, there may be a choice of screens with 8, 12 or 20 bits per screen cycle. The screen select controls the multiplexer 26 to select the proper counter 24, 25. The multiplexer output is then used as one of the address inputs to the SRAM 27. Finally, the scanned in contone data and the screen select lines are used as the rest of the address data for the SRAM. The output is 15 parallel bits which are applied to the overlay circuit 28, where 8 will be finally selected.

Figure 3:
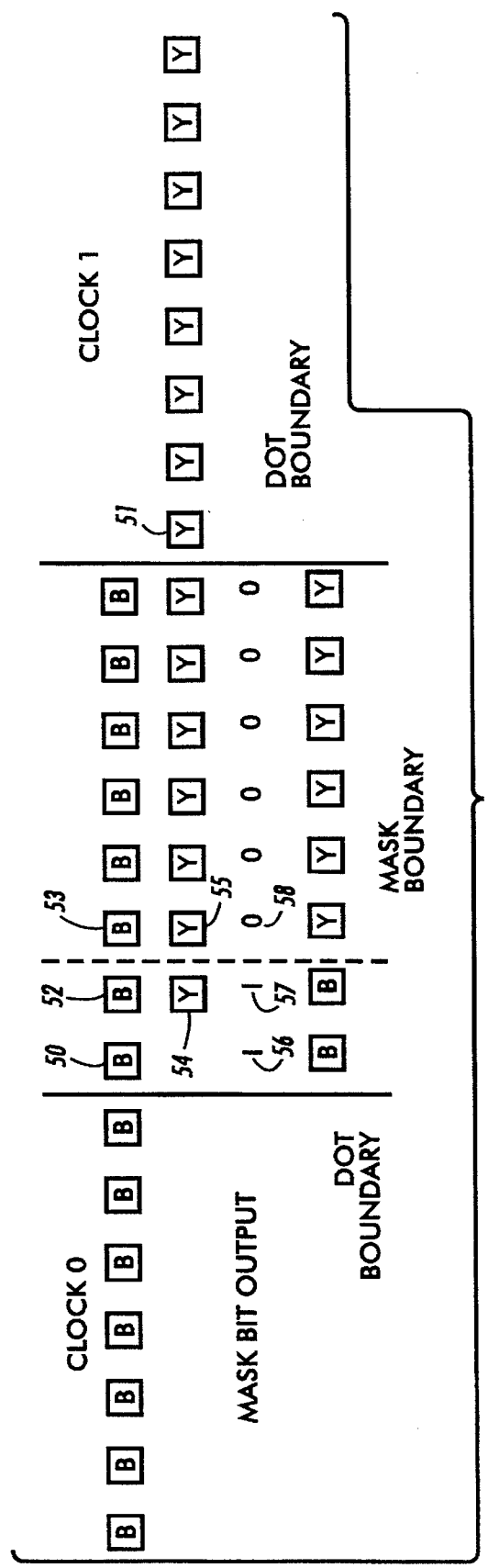
FIG. 3 is a timing diagram of the overlay bits.

The operation of the overlay circuit is described with reference to FIG. 3. At clock 0, fifteen bits are output from the SRAM and the last 7 are temporarily loaded into a buffer for use during the next cycle. In the particular embodiment and example that is being described herein, the central pixel 50 and the 7 bits on both sides are those required to print in a blue color. On the next clock cycle, fifteen bits of SRAM output centered around bit 51 are output, as shown. Assume these are yellow. If the current dot to be printed is to be a blue dot, then bit 50 and the seven bits to the right are selected and output to the printer.

On the other hand, if a character mask falls anywhere inside the dot, then the procedure is as follows. Assume that a blue text character mask extends to the point between bits 52 and 53, as shown by the dotted line. In other words, the output should be blue up to and including bit 52, and should revert to the background color, yellow, thereafter.

The process is to use the mask bits to control which bit in the same column should be output. Thus, in this example, since mask bits 56 and 57 are "1", the blue bits 50, 52 will be output, while the remaining mask bits 58 and following are "0" and the yellow bits will be output. In this way the mask outline can be positioned anywhere within a dot, while still using the halftone clock to access data from the halftone SRAM. An option is not to use bit 56 of the mask if it has already been determined that the boundary is within the dot, since blue bit 50 will always be selected in this case.

While the invention has been described with reference to a specific embodiment, it will be understood by those skilled in the art that various changes may be made and equivalents may be substituted for elements thereof without departing from the true spirit and scope of the invention. For example, any other number of bits per halftone dot and other circuits elements may be used to carry out the claimed circuit and method. In addition, other modifications may be made without departing from the essential teachings of the invention.

What is claimed is:

1. In a printer which prints a number, n, of bits per colored dot, one dot for each dot clock, the method of generating a transition from one color to another internal to a dot in accordance with a mask, comprising the steps of:

at the time of a first dot clock, generating 2n−1 bits of said first color, and storing the rightmost n−1 bits numbered, in one direction, 1 to n−1, at the time of a second dot clock, generating 2n−1 mask bits, and numbering the bits, in the same direction, 1 to n−1, outputting n−1 bits, numbered 1 to n−1 in the same direction, one bit for each numbered bit position, wherein a bit of said first color is output if the same-numbered mask bit is of one state, and wherein a bit of said second color is output if the same-numbered mask bit is of the other state.

2. In a printer which prints a number, n, of bits per dot, one dot for each dot clock, the circuit for generating a transition from a first color to a second color within a dot in accordance with mask bits, comprising:

means for generating a series of dot clocks including a first and second dot clock, means for generating 2n−1 bits of said first color at the time of said first dot clock, means for storing the rightmost n−1 bits of said first color numbered, in one direction, 1 to n−1, means for generating n−1 mask bits at the time of said second dot clock, and numbering the bits, in the same direction, 1 to n−1, means for generating 2n−1 bits of said second color at the time of said second dot clock, and numbering the leftmost n bits of said second color in the same direction, 1 to n−1 , and means for outputting n−1 bits, numbered 1 to n−1 in the same direction, one bit for each numbered bit position, wherein a bit of said first color is output if the same-numbered mask bit is of one state, and wherein a bit of said second color is output if the same-numbered mask bit is of the other state.

\* \* \* \* \*